(12) United States Patent
Kepplinger et al.

(10) Patent No.: US 6,235,082 B1
(45) Date of Patent: May 22, 2001

(54) PROCESS FOR PRODUCING LIQUID METAL AND FACILITIES FOR CARRYING OUT THE PROCESS

(75) Inventors: Werner Leopold Kepplinger, Leonding; Johann Wurm, Bad Zell; Johannes-Leopold Schenk, Linz, all of (AT)

(73) Assignees: Voest-Alpine Industrieanlagenbau GmbH, Linz (AT); Pohang Iron & Steel Co., Ltd., Kyong Sang Book-Do; Research Institute of Industrial Science & Technology, Pohang, both of (KR)

( * ) Notice: Subject to any disclaimer, the term of this patent is extended or adjusted under 35 U.S.C. 154(b) by 0 days.

(21) Appl. No.: 09/029,786

(22) PCT Filed: Jul. 9, 1997

(86) PCT No.: PCT/AT97/00155

§ 371 Date: May 24, 1998

§ 102(e) Date: May 24, 1998

(87) PCT Pub. No.: WO98/01585

PCT Pub. Date: Jan. 15, 1998

(30) Foreign Application Priority Data

Jul. 10, 1996 (AT) .................................................. 1226/96

(51) Int. Cl.$^7$ .............................. C21B 11/00; C21B 13/14
(52) U.S. Cl. ................................ 75/448; 75/531; 75/549; 266/156; 266/157; 266/172
(58) Field of Search .............................. 75/446, 491, 445, 75/448, 531, 549; 266/156, 157, 172

(56) References Cited

U.S. PATENT DOCUMENTS 2,964,308  12/1960  Walde ....................................... 266/9
4,032,305 * 6/1977  Squires ..................................... 48/73
4,671,497 * 6/1987  Schmitz et al. ........................ 266/172
5,435,832 * 7/1995  Kepplinger et al. .................... 75/549
5,439,504 * 8/1995  Czermak et al. ........................ 75/444
5,584,910 * 12/1996 Kepplinger et al. .................... 75/446
5,628,260 * 5/1997  Rongved ................................ 110/245
5,630,862 * 5/1997  Greenwalt ............................... 75/445

FOREIGN PATENT DOCUMENTS 394201    2/1992 (AT) .
1167368 * 4/1964 (DE) .
4240197   6/1994 (DE) .

* cited by examiner

Primary Examiner—Roy King
Assistant Examiner—Tima McGuthry-Banks
(74) Attorney, Agent, or Firm—Ostrolenk, Faber, Gerb & Soffen, LLP

(57) ABSTRACT

With a method for producing liquid metal from charging substances containing ore and of fluxes, the ore is directly reduced to sponge metal in at least one reduction zone (5, 7, 8), the sponge metal is melted along with fluxes in a melt-down gasifying zone (11) under the supply of carbon carriers and an oxygen-containing gas. A CO- and $H_2$-containing process gas serving as a reducing gas is produced, fed into the reduction zone (5, 7, 8), reacted there, and subsequently withdrawn, wherein slagforming fluxes, in particular calcium carbonate, dolomite etc., gas are calcined by the process gas in a calcining zone (26') that is separate from the reduction zone (5, 7, 8) and melt-down zone (11). To be able to employ slagforming fluxes of any desired grain and without disturbances of the reduction process, the calcining zone (26') is connected in parallel to the reduction zone (5, 7, 8) with respect to the material flow and the calcined fluxes are fed into the melter gasifier (10) directly.

17 Claims, 2 Drawing Sheets

US 6,235,082 B1

PROCESS FOR PRODUCING LIQUID METAL AND FACILITIES FOR CARRYING OUT THE PROCESS

BACKGROUND OF THE INVENTION

1. Field of the Invention

The invention relates to a method for producing liquid metal, in particular pig iron or liquid steel preproducts, from charging substances comprised of ore, in particular iron ore, and of fluxes, wherein the ore is directly reduced to sponge metal in at least one reduction zone, the sponge metal is melted along with fluxes in a melt-down gasifying zone under the supply of carbon carriers and of an oxygen-containing gas and a CO- and $H_2$-containing process gas serving as a reducing gas is produced which is fed into the reduction zone and is reacted there and subsequently is withdrawn, wherein slagforming fluxes, in particular calcium carbonate, dolomite etc., by means of the process gas are calcined in a calcining zone that is separate from the reduction zone and melt-down zone and to a plant for carrying out the method.

2. Brief Description of the Related Art

It is known to admix slag formers such as $CaCO_3$, dolomite etc. to the ore and effect calcination at the same time and in the same vessel as the reduction of the ore, i.e. in the reduction zone, wherein calcination is effected by means of the reducing gas. With a multistage reduction process, i.e. with a method in which several reduction zones are provided which are subsequently connected in series, complete calcination is effected only in the final reduction stage, as only in this stage the reducing gas has the temperature required for complete calcination. A disadvantage associated with this method is that the quality of the reducing gas will deteriorate, and further, that by the calcining process, which is endothermic, the reducing gas is decreased in temperature. Another disadvantage is that in the reduction of fine ore, the slagforming additions must have roughly the same grain size range so that the fluidized bed formed by the fine ore in the reduction reactor will remain largely undisturbed. Coarse-grained fluxes cannot be exploited in this manner.

From DE-A-42 40 197, a method of the initially described kind is known in which slagforming additions are treated in a separate calcining zone of a calciner, with reducing gas originating from the melter gasifier being employed for calcining purposes. In accordance with DE-A-42 40 197, the calcined fluxes are charged into the reduction reactor in the reduction zone and together with the already partially reduced ore are moved onward through the reduction shaft and finally are charged into the melter gasifier with the reduced ore.

Another disadvantage associated with this method is that the grain of the fluxes cannot be chosen freely. On the contrary, the grain or the grain size range respectively has to correspond to the grain or the grain size range respectively of the fine ore being moved through the reduction shaft. Further, an adverse effect on the reduction process, in particular on complete reduction, is to be expected, since the material and gas flow as well as the temperature profile are disturbed by the charging of the fluxes.

SUMMARY OF THE INVENTION

The invention aims at avoiding these disadvantages and difficulties and has as its object to provide a method of the initially described kind as well as a plant for carrying out the method, enabling the processing of slagforming additions of any desired grain. In particular, the reduction process for the ore is to proceed entirely undisturbed by fluxes and utilization of coarse-grained fluxes is feasible, so that a satisfactory porosity will exist in the melt-down gasifying zone.

With a method of the initially described kind, this object is achieved in that the calcining zone is connected in parallel to the reduction zone as regards the material flow and the calcined fluxes are fed into the melter gasifier directly.

If hot process gas is available in sufficient quantities, the calcining zone is suitably also connected in parallel to the reduction zone as regards the process gas flow, wherein advantageously the process gas after being discharged from the melt-down gasifying zone is purified and cooled and subsequently a portion of the process gas is fed into the reduction zone and a portion of the process gas is fed into the calcining zone.

The process gas leaving the calcining zone being still very hot, it is suitably admixed with the process gas leaving the reduction zone and advantageously is utilized for preheating and/or prereducing the ore in a prereduction zone.

In accordance with a further advantageous variant of the method, the calcining zone is connected in series to the reduction zone as regards the process gas flow, with the process gas flowing first through the reduction zone and subsequently through the calcining zone.

Since with this variant the process gas has already cooled down to some extent, advantageously an oxygen-containing gas is fed into the calcining zone and a portion of the process gas is combusted.

A plant for carrying out the method, comprising at least one reduction reactor into which the ore is conducted via a conveying duct in one direction and the reducing gas via a reducing-gas feed duct in the opposite direction, and comprising a melter gasifier into which runs a conveying duct conducting the reduction product from the reduction reactor and which is provided with feed ducts for oxygen-containing gases and carbon carriers as well as with a tap for liquid metal and slag as well as with a reducing-gas feed duct opening into the reduction reactor for a reducing gas generated in the melter gasifier, is characterized in that a calciner is provided in parallel arrangement with respect to the reduction reactor as regards the solids flow, wherein the calciner is flow-connected with the melter gasifier through a feed duct conducting the calcined materials to the melter gasifier.

Suitably, from the reducing-gas feed duct which leads to the reduction reactor, a branch duct departs and runs into the calciner.

In accordance with a preferred embodiment, a gas purifying means is provided in the reducing-gas feed duct and the branch duct departs from the reducing-gas feed duct at a position after the gas purifying means.

Another preferred embodiment is characterized in that the calciner is flow-connected with a preheating reactor for the ore through an offgas duct.

Suitably, a discharge duct for reacted reducing gas departs from the reduction reactor with a branch duct running into the calciner from said discharge duct, wherein advantageously a duct for an oxygen-containing gas opens into the calciner.

Preferably, the calciner is constructed as a shaft furnace or rotary tubular kiln or traveling grate or multiple-hearth furnace or single-stage or multistage fluidized-bed reactor or gas cyclone or as a multistage gas cyclone cascade.

DETAILED DESCRIPTION OF THE PREFERRED EMBODIMENTS

Figure 1:
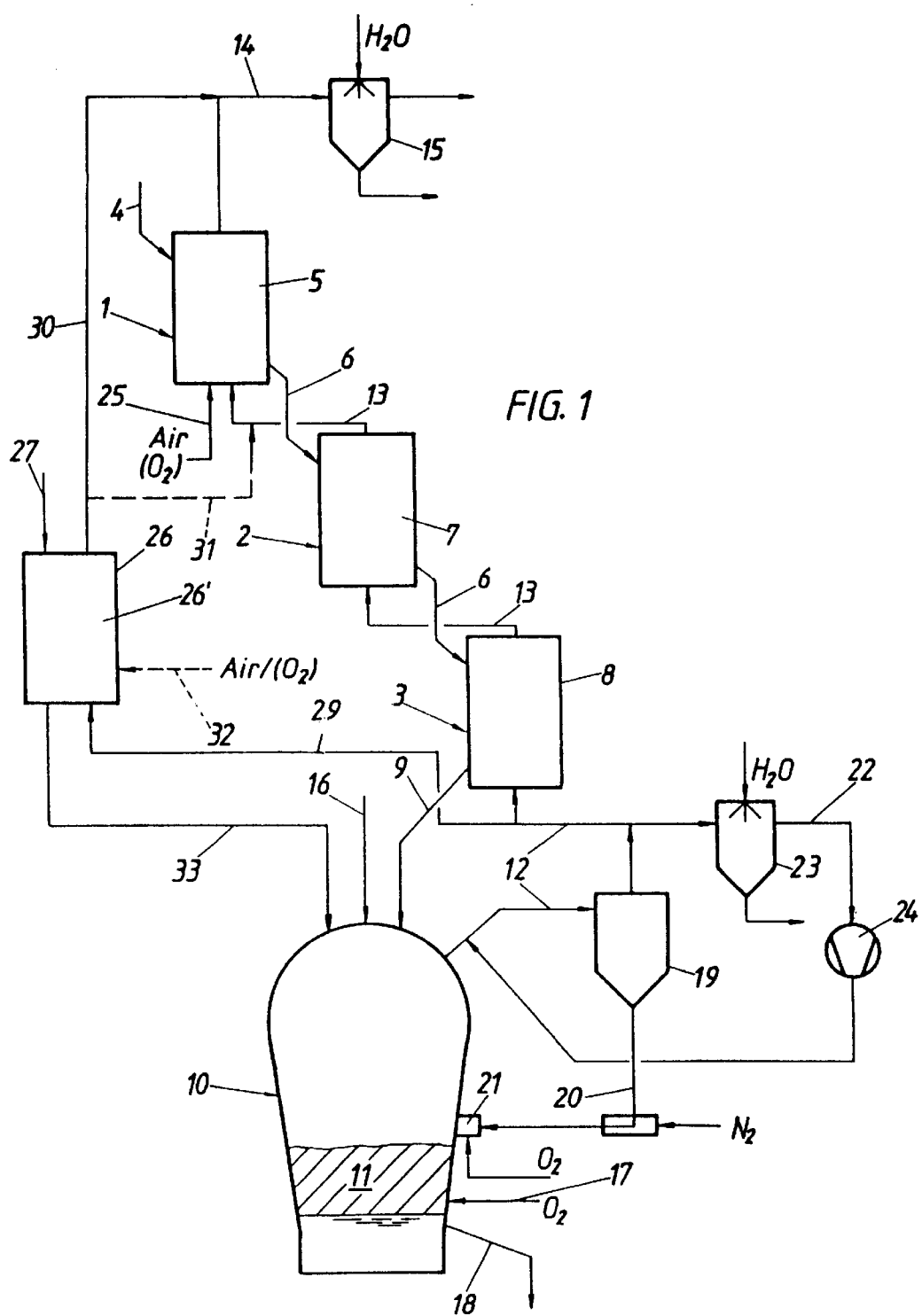
FIG. 1 is a schematic illustration of a first embodiment of a plant according to the present invention.

The invention will now be described in greater detail with reference to two exemplary embodiments represented in the drawing, wherein FIGS. 1 and 2, by way of example only, schematically depict an entire plant for producing metal melts, in particular pig iron or liquid steel preproducts.

The plant, according to FIG. 1 as well as according to FIG. 2, comprises three reduction reactors subsequently connected in series and constructed as fluidized-bed reactors 1 to 3. An ore comprised of a portion at least of fine-grained material, such as an iron-oxide-containing material, i.e. fine ore, via an ore feed duct 4 is supplied to the first fluidized-bed reactor 1 in which, in a preheating stage 5, preheating of the fine ore and possibly prereduction take place, and subsequently is conducted from fluidized-bed reactor 1 to fluidized-bed reactor 2, 3 via conveying ducts 6. Inside the fluidized-bed reactor 2, prereduction is effected in a prereduction stage 7, and inside the fluidized-bed reactor 3, in a final reduction stage 8, final or complete reduction, respectively, of the fine ore to sponge iron, each by means of a process gas.

Via a conveying duct 9, the completely reduced material, hence the sponge iron, is fed into a melter gasifier 10. Inside the melter gasifier 10, in a melt-down gasifying zone 11, a CO- and $H_2$-containing process gas serving as a reducing gas is generated from carbon carriers such as coal and from oxygen-containing gas and via a reducing-gas feed duct 12 is fed into the fluidized-bed reactor 3 arranged last in the direction of flow of the fine ore. The reducing gas is then in counterflow to the ore flow conducted from fluidized-bed reactor 3 to fluidized-bed reactor 2 to 1, namely via the connecting ducts 13, is conducted out of the fluidized-bed reactor 1 as a top gas via a top-gas discharge duct 14, and subsequently is cooled and scrubbed in a wet scrubber 15. It can then be supplied to a consumer.

The melter gasifier 10 is provided with a feed duct 16 for solid carbon carriers, a feed duct 17 for oxygen-containing gases as well as optionally feed ducts for carbon carriers that are liquid or gaseous at room temperature, such as hydrocarbons, and for calcined fluxes. Inside the melter gasifier 10, below the melt-down gasifying zone 11, molten pig iron or molten steel prematerial respectively and molten slag collect, which are tapped off through a tap 18.

In the reducing-gas feed duct 12 departing from the melter gasifier 10 and running into the fluidized-bed reactor 3, a dedustifying means 19 such as a hot gas cyclone is provided, the dust particles separated in said cyclone being fed to the melter gasifier 10 via the return duct 20, with nitrogen as the conveying means and passing via a burner 21 under the blowing of oxygen.

A possibility for adjusting the reducing-gas temperature results due to the gas recirculating duct 22, which is preferably provided and which departs from the reducing-gas feed duct 12 and feeds back a portion of the reducing gas into said reducing-gas feed duct 12 via a scrubber 23 and a compressor 24, namely at a position ahead of the hot gas cyclone 19.

In order to adjust the preheating temperature of the fine ore, it is feasible to supply to the preheating stage 5, hence to the fluidized-bed reactor 1, an oxygen-containing gas such as air or oxygen through a duct 25, whereby a partial combustion of the reacted reducing gas supplied to the preheating stage 5 takes place.

In accordance with the embodiment depicted in FIG. 1, a separate calciner 26 is provided, which with regard to the material flow, i.e. regarding the slagforming additions charged into the calciner 26 via the feed duct 27 and with regard to conveying the calcined fluxes into the melter gasifier 10 via a feed duct, is connected so as to be arranged in parallel with the fluidized-bed reactors 1 to 3. As the process gas for the calcining operation, a reducing gas branched off from the reducing-gas feed duct 12 is charged into the calcining zone 26' in the calciner 26 via a branch duct 29. The offgas leaving the calciner 26 either is admixed with the top gas by an offgas duct 30 running into the top-gas discharge duct 14 or is utilized for preheating and/or prereduction in the fluidized-bed reactor 1, wherein the offgas discharged from the calciner 26 is conducted to the fluidized-bed reactor 1 via an offgas feed duct 31. The latter advantageously runs into the connecting duct 13 which runs into said fluidized-bed reactor 1 and through which reacted reducing gas from the fluidized-bed reactor 2 flows into the fluidized-bed reactor 1.

If necessary, air or another oxygen-containing gas or pure oxygen can be supplied to the calciner 26 via a duct 32, whereby a partial combustion of the reducing gas fed into the calciner 26 ensues so that its temperature is increased and the calcining process can take place in the desired manner.

Supply into the melter gasifier 10 of the calcined fluxes can be effected via a separate feed duct 33 opening directly into the melter gasifier 10, as illustrated in FIG. 1, or else in that said feed duct 33 opens into the conveying duct 9 for the sponge iron or into the feed duct 16 for solid carbon carriers.

Figure 2:
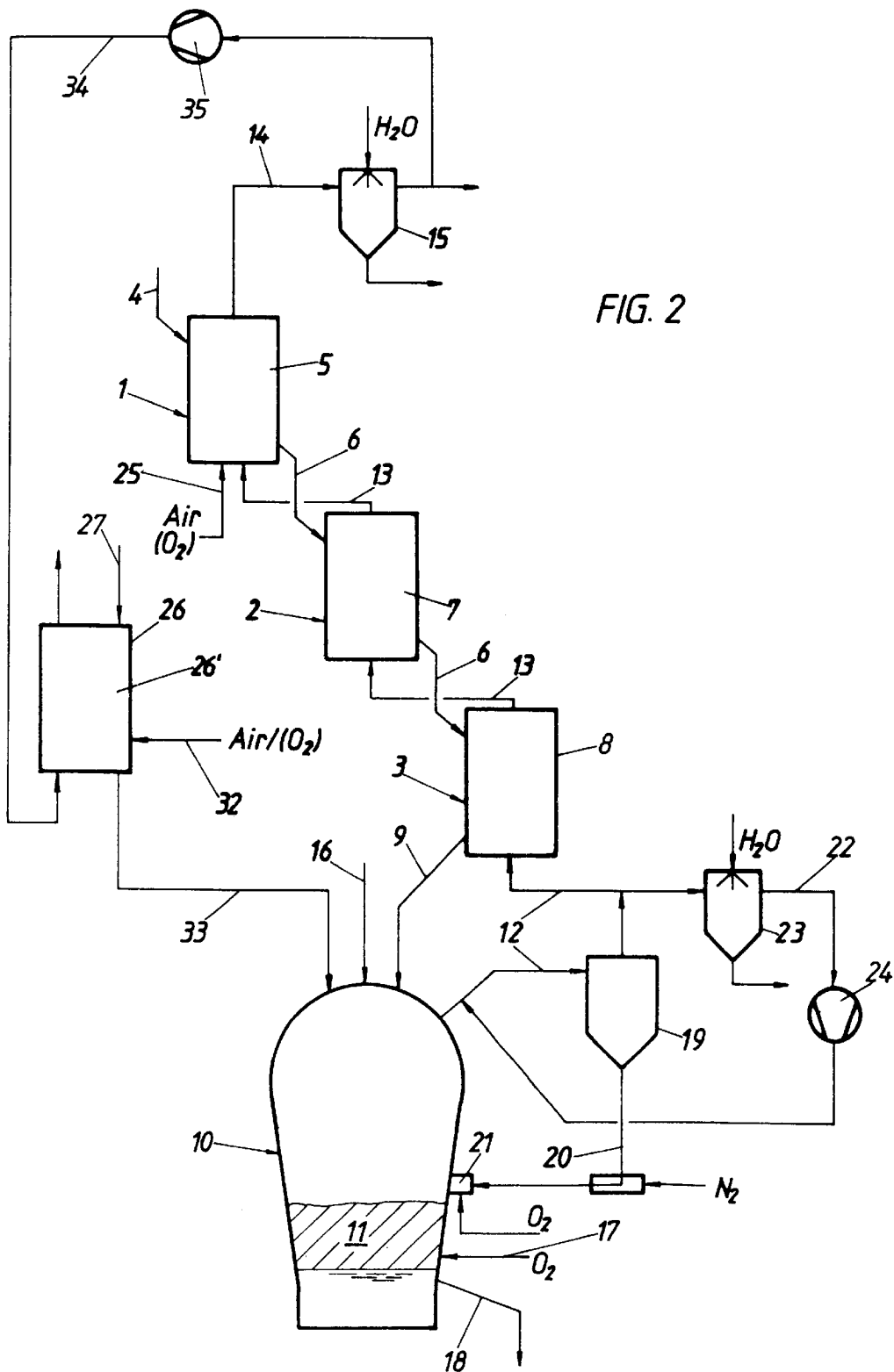
FIG. 2 is a schematic illustration of a second embodiment of a plant embodiment to the present invention.

In accordance with the embodiment illustrated in FIG. 2, the calciner 26 is also connected in parallel with respect to the fluidized-bed reactors 1 to 3 as regards the material flow, but as regards the gas flow is arranged in series to the fluidized-bed reactors 1 to 3. To serve as the process gas for the calcining operation, a top gas withdrawn from the top-gas discharge duct 14 via a branch duct 34 equipped with a compressor 35 is charged into the calciner 26. In order to attain the temperature necessary for the calcining process, air or an oxygen-containing gas or oxygen is supplied to the calciner 26 via a feed duct 32, whereby a partial combustion of the process gas and thus the required temperature increase will ensue.

In accordance with the invention there result the following advantages:

With regard to the slagforming fluxes, there are no restrictions concerning grain sizes; any desired grain size thereof may be utilized, wherein advantageously coarse-grained fluxes are employed, since this way no decrease in porosity within the fluidized bed of the melter gasifier 10 will incur.

Another essential advantage is to be seen in that there will be no effect on the composition of the reducing gas during the reduction process, in none of the preheating 5 and/or reduction stages 7, 8.

It is feasible to utilize the top gas, which still possesses a calorific value.

The temperature profile of the fluxes does not exert an effect on the reduction zones.

What is claimed is:

1. A method for producing liquid pig iron or liquid steel preproducts from feed streams of ore and of slagforming fluxes, comprising:

directly reducing the ore to sponge metal in at least one fluidized bed reduction zone;

melting the sponge metal in a melt-down gasifying zone under the supply of carbon carriers and an oxygen-containing gas;

producing a CO- and $H_2$-containing process gas to serve as a reducing gas in the melt-down gasifying zone and feeding the reducing gas through the reduction zone in counterflow to the ore;

reacting the reducing gas with the ore in the reduction zone;

subsequently withdrawing the reacted reducing gas;

calcining the slagforming fluxes with only the process gas in a calcining zone that is separate from the reduction zone and melt-down zone, wherein the calcining of the slagforming fluxes in the calcining zone is performed in parallel to the reducing of the ore in the reduction zone; and feeding the calcined fluxes from the calcining zone directly into the melter gasifier and separately from the sponge metal to be melted along with the sponge metal in the melt-down gasifying zone under the supply of carbon carriers and the oxygen-containing gas.

2. A method according to claim 1, further comprising feeding a first portion of the process gas through the calcining zone in parallel to the reduction zone in which a second portion of the process gas, which serves as the reducing gas, is reacted.

3. A method according to claim 2, further comprising purifying and cooling the process gas after being discharged from the melt-down gasifying zone; and subsequently feeding the second portion of the process gas into the reduction zone and also feeding the first portion of the process gas into the calcining zone.

4. A method according to claim 3, further comprising admixing the process gas leaving the calcining zone with the process gas leaving the reduction zone.

5. A method according to claim 3, further comprising utilizing the process gas leaving the calcining zone for preheating and/or prereducing the ore in a prereduction zone.

6. A method according to claim 1, wherein the process gas flows in series first through the reduction zone and subsequently through the calcining zone.

7. A method according to claim 6, further comprising feeding an oxygen-containing gas into the calcining zone; and combusting a portion of the process gas in the calcining zone.

8. A plant for producing liquid pig iron or liquid steel preproducts from feed streams of ore and of slagforming fluxes, comprising:

at least one fluidized bed reduction reactor in which the ore is directly reduced to a reduction product;

a first conveying duct for conveying the ore in one direction to be reduced in the at least one reduction reactor;

a reducing-gas feed duct for conveying a reducing gas in a direction opposite to the direction in which the ore is conveyed;

a melter gasifier in which the reducing gas is generated;

a second conveying duct for conducting the reduction product from the reduction reactor to the melter gasifier;

feed ducts for conveying oxygen-containing gases and carbon carriers into the melter gasifier;

a tap for tapping liquid metal and slag from the melter gasifier;

a reducing-gas feed duct leading into the reduction reactor for conveying the reducing gas generated in the melter gasifier; and a calciner provided in parallel arrangement with respect to the reduction reactor so that the slagforming fluxes and the ore flow through the calciner and the reduction reactor, respectively to the melter gasifier directly and separately, wherein the calciner is flow-connected with the melter gasifier through a feed duct which conducts the calcined materials to the melter gasifier.

9. A plant according to claim 8, further comprising a branch duct departing from the reducing-gas feed duct which leads to the at least one reduction reactor, the branch duct leading into the calciner.

10. A plant according to claim 9, further comprising a gas purifying means provided in the reducing-gas feed duct, and wherein the branch duct departs from the reducing-gas feed duct at a position after the gas purifying means.

11. A plant according to claim 9, further comprising a preheating reactor; and an offgas duct for flow-connecting the ore from the calciner to the preheating reactor.

12. A plant according to claim 8, further comprising a discharge duct through which reacted reducing gas departs from the reduction reactor; and a branch duct running into the calciner from said discharge duct.

13. A plant according to claim 12, further comprising a feed duct for feeding an oxygen-containing gas into the calciner.

14. A plant according to claim 8, comprising at least two fluidized-bed reactors connected in series, wherein:

the ore is conducted from a first one of the fluidized-bed reactors to a second one of the fluidized-bed reactors via conveying ducts in one direction;

the reducing gas is conducted from the second fluidized-bed reactor to the first fluidized-bed reactor via reducing-gas connecting ducts in a direction opposite to the direction in which the ore is conducted;

the second conveying duct conveys the reduction product from the second fluidized-bed reactor into the melter gasifier; and further comprising a gas discharge duct from the melter gasifier which connects with the reducing-gas feed duct which in turn leads into the second fluidized-bed reactor.

15. A plant according to claim 8, wherein the calciner is constructed as a shaft furnace or a rotary tubular kiln or a traveling grate or a multiple-hearth furnace or a single-stage fluidized-bed reactor or a multistage fluidized-bed reactor or a gas cyclone or a multistage gas cyclone cascade.

16. A method according to claim 1, wherein the slagforming fluxes includes at least one of calcium carbonate and dolomite.

17. A method according to claim 1, wherein the feed stream of ore is iron ore.

* * * * *